(12) United States Patent
Merchant et al.

(10) Patent No.: US 6,458,016 B2
(45) Date of Patent: Oct. 1, 2002

(54) POLISHING FLUID, POLISHING METHOD, SEMICONDUCTOR DEVICE AND SEMICONDUCTOR DEVICE FABRICATION METHOD

(75) Inventors: Sailesh Mansinh Merchant; Sudhanshu Misra; Pradip Kumar Roy; Hem M. Vaidya, all of Orlando, FL (US)

(73) Assignee: Agere System Guardian Corp., Orlando, FL (US)

( * ) Notice: Subject to any disclaimer, the term of this patent is extended or adjusted under 35 U.S.C. 154(b) by 0 days.

(21) Appl. No.: 09/894,116

(22) Filed: Jun. 28, 2001

Related U.S. Application Data

(62) Division of application No. 09/483,576, filed on Jan. 14, 2000.

(51) Int. Cl.[7] .............................................. B24B 21/18
(52) U.S. Cl. .............................. 451/23; 451/60; 51/307; 252/79.1
(58) Field of Search .......................... 451/23, 60, 285, 451/287; 51/307–309; 106/3; 438/692, 693; 252/79.1, 79.2, 79.3

(56) References Cited

U.S. PATENT DOCUMENTS

| | | | |
|---|---|---|---|
| 5,084,071 A | | 1/1992 | Nenadic et al. |
| 5,451,637 A | | 9/1995 | Leibfried |
| 5,596,120 A | * | 1/1997 | Banks et al. ................. 556/480 |
| 5,684,060 A | | 11/1997 | Konings et al. |
| 5,716,264 A | * | 2/1998 | Kimura et al. ............... 451/443 |
| 5,954,997 A | * | 9/1999 | Kaufman et al. ........... 252/79.1 |

* cited by examiner

*Primary Examiner*—Joseph J. Hail, III
*Assistant Examiner*—Anthony Ojini

(57) ABSTRACT

A polishing fluid comprising a distributed organic phase and a continuous aqueous phase. The distributed phase has at least one complexing agent and the aqueous phase has abrasive particles dispersed therein. Reaction products generated during polishing interact with the complexing agent(s) to form organometallic complexes. Further disclosed is a polishing method, a semiconductor device and semiconductor device fabrication method utilizing the polishing fluid.

18 Claims, 1 Drawing Sheet

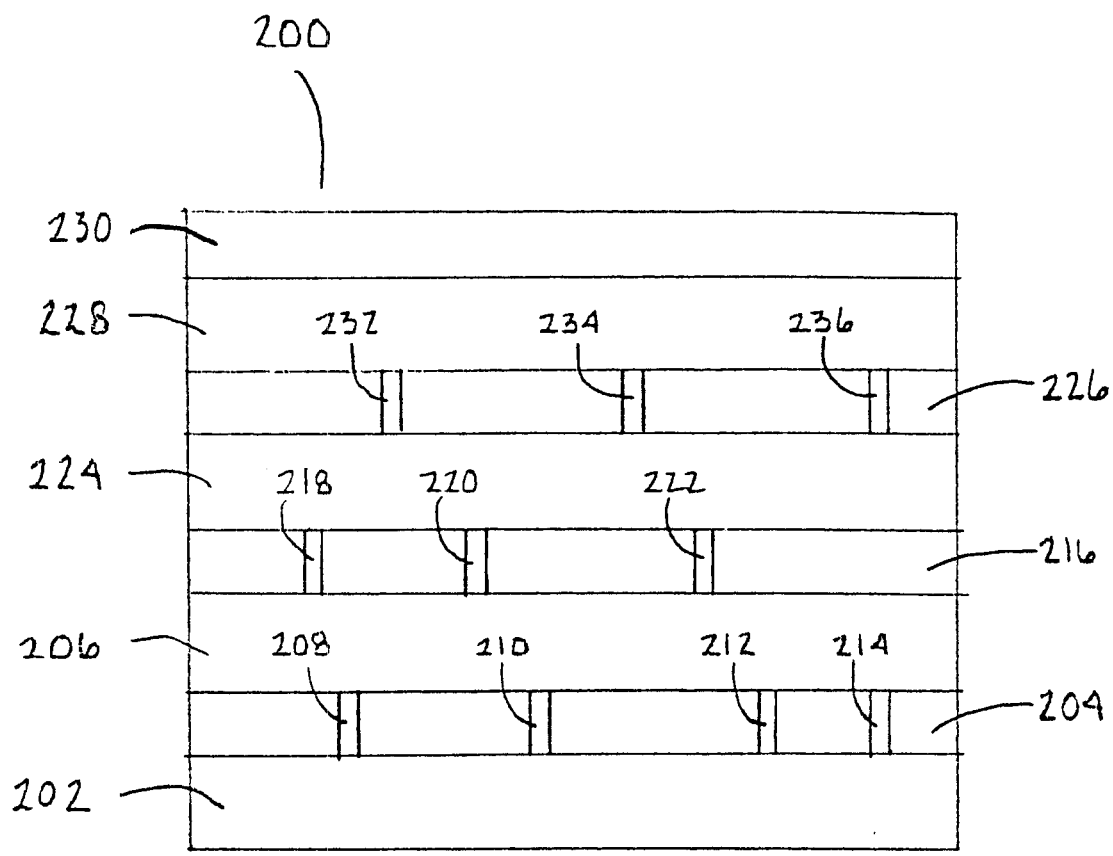
FIGURE

POLISHING FLUID, POLISHING METHOD, SEMICONDUCTOR DEVICE AND SEMICONDUCTOR DEVICE FABRICATION METHOD

This application is a divisional of application Ser. No. 09/483,576, filed Jan. 14, 2000, incorporated herein by reference.

FIELD OF THE INVENTION

The invention relates to semiconductor devices and fabrication methods, and more particularly to polishing of device layers.

BACKGROUND OF THE INVENTION

Surface finishing in many arts may utilize polishing and/or planarization. As used herein the term "polishing" shall include polishing and/or planarization. Polishing is of particular importance in the manufacturing of semiconductor devices. The concentration of integrated circuit components included on a semiconductor chip is continually increasing. Concentration may be increased by decreasing component size. As component size decreases, surfaces on which components are formed should be increasingly smooth to produce desired component configurations and thereby reduce failure rates and increase product yield. Therefore, the effectiveness of polishing fluids has significant impact on the quality of integrated circuits produced.

Semiconductor devices typically comprise multiple layers, throughout which are incorporated integrated circuits. Integrated circuit features and components, which may vary in height, are typically created by lithographic processes on each layer. Height variations contained on one layer may present themselves on subsequent layers creating non planar layer surfaces. Such surface irregularities may be problematic in lithographic processes used to form additional circuit components. Therefore, it is desirable to perform lithographic processes only on substantially smooth and planar surfaces.

A typical semiconductor device fabrication lithographic process includes depositing a radiation sensitive material or resist on a surface, exposing the resist to radiation through a mask to transfer a desired pattern onto the surface, and developing the resist to reveal the exposed pattern. Typically, if a resist is deposited on an irregular surface, it will have a corresponding irregularity. Such irregularities may cause variations in a depth of focus across the device so that pattern features may not be brought uniformly into sharp focus. If portions of the surface are not in focus, the pattern may not be accurately transferred.

Additionally, surface irregularities may adversely affect device interconnect reliability because metal layers deposited over a surface irregularity may acquire unwanted configurations. These configurations may cause undesirable current crowding in metal layers. For the above reasons polishing is an important step in semiconductor device fabrication processes.

Chemical-mechanical polishing (CMP) is a technique widely used in the fabrication of semiconductor devices. CMP is performed by introducing a polishing fluid or slurry between a work piece surface and a polishing article and moving the article and device relative to one another. The slurry generally comprises abrasive particles which may mechanically and chemically wear down unwanted surface irregularities. Additional constituents chemically react with the work piece surface to smooth and planarize it. A polishing article, such as a polishing pad may also mechanically wear away surface irregularities.

CMP reaction products may become imbedded in the surface which is being polished, and may cause scratches, particle defects and impurities in surfaces. For example, during copper CMP, traces of copper and barrier metal may be seen in the oxide dielectric layer. Defects, scratches and impurities may reduce the reliability of the device. It is known in the art to utilize chemical solutions such as hydrofluoric acid (HF) to clean a surface after CMP to reduce adverse effects of reaction products. Although generally helpful in removing reaction products, such solutions may etch away a portion of the layer that was polished. Additionally, planarity or smoothness may be degraded by such post-CMP processes because of step generations caused by dielectric oxide removal. Furthermore, solutions such as HF used in copper CMP may attack barrier films causing localized corrosion in copper trenches. Therefore, it is desirable to develop a polishing fluid and method that remove reaction products from the surface being polished without damaging the polished layer.

SUMMARY OF THE INVENTION

The invention relates to a polishing fluid and method for polishing particularly useful in the fabrication of semiconductor devices. Further disclosed is a semiconductor device and a method for fabricating a semiconductor device employing the polishing fluid.

The polishing fluid comprises a distributed organic phase having a complexing agent and a continuous aqueous phase having abrasive particles dispersed therein. Reaction products generated during polishing interact with the complexing agent to form organometallic complexes in the organic phase, thereby substantially removing them from the surface being polished.

DESCRIPTION OF THE DIAGRAM

A cross-sectional view of a semiconductor device.

DETAILED DESCRIPTION OF THE INVENTION

It will be appreciated that the following description is intended to refer to specific embodiments of the invention selected for illustration and is not intended to define or limit the invention, other than in the appended claims.

The polishing fluid of the invention comprises a distributed organic phase and a continuous aqueous phase. The organic phase is dispersed in the continuous aqueous phase resulting in an oil-in-water type of emulsion useful, for example, as a CMP slurry. Advantageously the distributed organic phase contains one or more complexing agents which, during polishing, interact with reaction products to form organometallic complexes. Reaction products are species removed from the work piece surface during polishing such as, for example, tungsten, copper, aluminum, titanium, silicon tungsten oxide, copper oxide, titanium oxide and silicon oxide.

The general equation for the formation of the organometallic complexes is:

$$M^+(aq)+R\text{—}OH=M\text{—}R+H_2O$$

where $M^+(aq)$ is a metal ion in the aqueous phase, R—OH is the complexing agent and M—OR is an organometallic complex.

The reaction products diffuse to an organic/water interface. Upon entering the organic phase they react with the complexing agents to form organometallic complexes. Once organometallic complexes are formed they generally remain in the organic phase as polishing proceeds. Therefore, by diffusion to the organic phase and subsequent formation of organometallic complexes, reaction products are substantially removed and maintained away from a work piece surface. Removing and maintaining metals away from the work piece surface substantially eliminates possible detrimental effects posed by continued polishing with a reaction product-containing slurry.

A complexing agent may be any compound that would react with metal ions in the organic phase to form organometallic complexes. Diethylene-triamine-penta-acidic acid is generally an effective complexing agent for any metal. For copper applications bipyridine or orthophenanthroline have been found to be particularly effective. 8-hydroxy-quinoline may be used as a complexing agent and has been found to be particularly effective for slurries used to polish aluminum. Combinations of complexing agent may also be used.

The organic phase may advantageously be regenerated and reused for emulsion formation. After the polishing fluid has been utilized, organometallic complexes are dissolved in the organic phase. The organometallic complexes can be split from the organic phase to regenerate organic solvent. Regeneration may be performed by ion exchange or by dissolution in an acidic medium or any other method that strips the solvent of the organometallic complexes.

The aqueous phase contains abrasive particles which may mechanically wear away material from a work piece being polished and may also react chemically with the surface material to further effect polishing. Abrasive particles preferably comprise about 5 weight percent to about 30 weight percent of the polishing fluid. Examples of abrasives include, but are not limited to, ceria, alumina, silica, magnesium oxide, and combinations thereof These abrasives are particularly effective in chemical mechanical polishing of semiconductor device layers.

The diameter of the abrasive particles is preferably in the range of about 100 nm to about 1000 nm, more preferably in the range of about 200 nm to about 500 nm and most preferably in the range of about 300 nm to about 400 nm. Particles may be any shape, with the "diameter" denoting roughly the longest dimensional line of the particle taken from one surface point to another, through the particle midpoint. If particles are too large, meaning greater than about 1100 nm, scratching of the surface being polished may occur. Additionally, removal rates may be too high and, therefore, difficult to control or limit, and polishing results may be less uniform.

The weight percent of solids contained in the slurry may affect polishing results. For example, too high a weight percent of solids, generally greater than 50%, may cause scratching of the surface being polished, higher than desired removal rates or non uniform polishing. Solids as used herein refer to abrasives, salts such as for example $NH_4NO_3$, stabilizers, abrasive agglomerates and any other component present in a solid phase. The percent solids is preferably in the range of about 20 weight percent to about 50 weight percent of the polishing fluid.

The organic phase may contain additives to attain a particular pH, the desired value of which is dependent on the slurry application. Additives may also be used to alter reaction characteristics to tailor the chemical potential gradient which transports metal species across the aqueous phase. Other components that may enhance polishing or improve characteristics of the polishing fluid, such as for example, to increase shelf life or polishing uniformity, may also be added to the organic phase.

The aqueous phase may also include one or more of the following constituents: oxidants, emulsion stabilizers, surfactants, and acids or alkali components. Other components that may enhance polishing or improve characteristics of the polishing fluid may also be added to the aqueous phase.

Oxidants may include, for example, $NH_4OH$, $NH_4NO_3$, $H_2O_2$ or mixtures thereof. These components oxidize metal surfaces to enhance polishing. The oxides of metals such as for example, Ta, Ti, W and Al, are softer than the pure metal and, therefore, are more easily polished. For some metals, for example copper, oxidants also protect the surface from corrosion. An oxidized layer acts as a passivization layer that protects the bulk metal from corrosion. In this manner CMP and oxidation may occur simultaneously.

Emulsion stabilizers keep phases substantially uniformly dispersed and protect the polishing fluid from degradation such as from fungal growth. Emulsion stabilizers may include, for example, sulfonates, but any emulsion stabilizer that aids in substantially uniformly dispersing the phases or that protects against slurry degradation may be used, provided that its benefits do not outweigh any negative effects on polished surfaces or to slurry polishing capabilities.

Surfactants may be utilized to aid in creating and maintaining the distributed phase within the continuous phase. Surfactants comprise hydrophilic and hydrophobic groups allowing them to attract both the distributed and continuous phases, thereby facilitating immiscibility. Surfactants may also improve the slurry's ability to wet the work piece or polishing article. Surfactants may include, but are not limited to, alkyl, benzyl, lauryl sulfonates or combinations thereof.

Acids or alkali solutions may be added for pH control. The desired pH of the polishing fluid depends on the type of surface being polished. For example, a pH in the range of about 2 to about 6 is preferable when polishing metals, whereas a pH in the range of about 9 to about 13 is preferable when polishing dielectrics which typically comprise oxides. Generally, in applications of the inventive slurry the pH is preferably between about 2 and about 6 and more preferably between about 3 and about 5.

The ratio of the distributed phase to the continuous phase is preferably in the range of about 2:98 volume percent to about 50:50 volume percent of the polishing fluid, and more preferably in the range of about 5:95 volume percent to about 40:60 volume percent. Volume percent of the distributed phase to the continuous phase in excess of 50:50 may result in reversal of the distributed and the continuous phases. Therefore, to ensure the integrity of the slurry system, the volume percent ratio should be maintained below 50:50.

The invention further includes a semiconductor device and fabrication method wherein at least some device layers are polished utilizing the polishing fluid of the invention. Device performance and reliability is expected to be improved due to the removal of reaction products from surfaces during polishing steps. The removal of reaction products will generally reduce scratching, allow for smoother, more planar surfaces, and reduce interference of device functions by reaction products.

The drawing depicts a schematic of a semiconductor device 200. Those skilled in the art will understand that it shows a simplified drawing of semiconductor device 200 for illustrative purposes only. For example, an actual device may have layers of varying thicknesses and may contain other components. Semiconductor substrate 202 is covered by a first dielectric layer 204. Above first dielectric layer 204 is a first metal layer 206. Vias or interconnects 208, 210, 212 and 214 penetrate layer 204 and conductively connect first metal layer 206 to semiconductor substrate 202. First metal layer 206 is covered by second dielectric layer 216 which contains vias 218, 220 and 222 to connect first metal layer 206 to a second metal layer 224. This layering sequence may be repeated as necessary as shown in part by layers 226 and 228, and interconnects 232, 234 and 236. A top passivation layer 230 may be applied to protect device 200 from adverse electrical, chemical or other conditions, and to provide electrical stability.

Semiconductor substrate 202 may comprise silicon for example. Common dielectrics include, but are not limited to, silicon oxides, such as boron phosphorous doped silicate glass (BPSG), tetraethylorthosilicate (TEOS) and silicon dioxide ($SiO_2$). Common metals include, for example, aluminum, copper and tungsten. In addition, to improve adherence between metal and dielectric layers, thin layers may be introduced between them. Titanium is commonly used for this purpose. Electronic circuitry is defined in the layers by a lithographic technique.

In the lithographic process used to form the circuitry in device 200 a resist is deposited over a device layer. The resist is exposed by transmitting radiation through a mask or reticle onto the layer surface. The mask pattern defines the desired circuitry or other feature. The form of radiation used is dependent on the type of resist and other fabrication parameters. Any form of radiation that may expose the resist without adverse effects to the work piece may be used. Common examples include, ultraviolet radiation, electron beam radiation and x-rays. If a positive resist is used, the exposed areas will be removed revealing the dielectric layer below. The dielectric layer may then be removed, for example by etching. Any technique that will remove the exposed dielectric layer while leaving the resist covered portions intact may also be used. Negative resists may be used wherein the exposed resist areas are left intact after exposure and the non exposed areas are removed. For negative resist processes a mask is used that defines the spaces between circuit components rather than the circuitry itself. Similar lithographic processes may also be employed to form the interconnects in the dielectric layers or other device features.

Surfaces of some or all of the device layers may be polished during device 200 fabrication to create a substantially smooth, planar surface for accurate transfer of circuit patterns and creation of circuit components, and to satisfactorily carry out other fabrication steps. At least some of the polishing may be carried out using the slurry and method described herein. Surfaces are polished by bringing a polishing article in at least partial contact with the surface. The polishing fluid of the invention is introduced between the semiconductor device surface being polished and a polishing article. The semiconductor device surface and polishing article are effectively moved in relation to one another. This may be accomplished by either moving the device or the polishing article in relation to a polishing apparatus or moving both the device and the polishing article in relation to one another. Once the layer is polished it can undergo further processes if necessary to fabricate the semiconductor device.

What is claimed is:

1. A polishing fluid comprising a distributed organic phase and a continuous aqueous phase, the distributed phase having at least one complexing agent selected from the group consisting of diethylene-triamine-penta-acidic acid, bipyridine, orthophenanthroline, 8-hydroxy-quinoline and a combination thereof, and the aqueous phase having abrasive particles dispersed therein, wherein reaction products generated during polishing interact with the complexing agent(s) to form organometallic complexes.

2. The polishing fluid of claim 1 wherein the complexing agent is selected from the group consisting of diethylene-triamine-penta-acidic acid, bipyridine, orthophenanthroline, 8-hydroxy-quinoline and a combination thereof.

3. The polishing fluid of claim 1 wherein the aqueous phase further comprises one or more components selected from the group consisting of oxidants, surfactants and emulsion stabilizers.

4. The polishing fluid of claim 3 wherein the oxidant is selected from the group consisting of $NH_4OH$, $NH_4NO_3$, $H_2O_2$ and a combination thereof.

5. The polishing fluid of claim 3 wherein the emulsion stabilizer is a sulfonate.

6. The polishing fluid of claim 3 wherein the surfactant is selected from the group consisting of alkyl, benzyl, lauryl sulfonates and combinations thereof.

7. The polishing fluid of claim 1 wherein the abrasive particles are selected from the group consisting of ceria, alumina, silica, magnesium oxide and combinations thereof.

8. The polishing fluid of claim 1 wherein the ratio of the distributed phase to the continuous phase is about 2:98 volume percent to about 50:50 volume percent of the polishing fluid.

9. The polishing fluid of claim 1 wherein the ratio of the distributed phase to the continuous phase is about 5:95 volume percent to about 40:60 volume percent of the polishing fluid.

10. The polishing fluid of claim 1 wherein the pH of the polishing fluid is in a range of about 2 to about 6.

11. The polishing fluid of claim 1 wherein the pH of the polishing fluid is in a range of about 3 to about 5.

12. The polishing fluid of claim 1 wherein the abrasive particles comprise about 5 weight percent to about 30 weight percent of the polishing fluid.

13. The polishing fluid of claim 1 wherein the solids comprise about 20 weight percent to about 50 weight percent of the polishing fluid.

14. The polishing fluid of claim 1 wherein the diameter of the abrasive particles is in the range of about 100 nm to about 1000 nm.

15. The polishing fluid of claim 1 wherein the diameter of the abrasive particles is in the range of about 200 nm to about 500 nm.

16. The polishing fluid of claim 1 wherein the diameter of the abrasive particles is in the range of about 300 nm to about 400 nm.

17. A polishing fluid comprising a distributed organic phase and a continuous aqueous phase, the distributed phase having at least one complexing agent, and the aqueous phase having abrasive particles dispersed therein, wherein reaction products generated during polishing interact with the complexing agent(s) to form organometallic complexes, wherein the surfactant is selected from the group consisting of alkyl, benzyl, lauryl sulfonates and combinations thereof.

18. A polishing fluid comprising a distributed organic phase and a continuous aqueous phase, the distributed phase having at least one complexing agent, and the aqueous phase having abrasive particles dispersed therein, wherein reaction products generated during polishing interact with the complexing agent(s) to form organometallic complexes, wherein the abrasive particles are selected from the group consisting of ceria, alumina, silica, magnesium oxide and combinations thereof.

* * * * *